April 19, 1927.

E. J. HALL

PISTON

Filed April 18, 1923

1,625,119

INVENTOR.
Elbert J. Hall
BY
ATTORNEYS.

Patented Apr. 19, 1927.

1,625,119

UNITED STATES PATENT OFFICE.

ELBERT J. HALL, OF BERKELEY, CALIFORNIA.

PISTON.

Application filed April 18, 1923. Serial No. 632,913.

This invention relates to pistons for internal combustion engines.

Due to the unevenness of expansion as between the cylinder and piston, pistons as hitherto constructed have too much clearance when the engine is cold and too little clearance when hot, causing thereby a great deal of piston slap and loss of power before the engine gets warmed up, and excessive friction when the engine is hot. This condition is aggravated where aluminum alloy pistons are used with cast iron cylinders, since there is not only the difference of temperature between the piston and cylinder to contend with, but also another difference in the coefficient of expansion of iron and aluminum.

The present invention has for its object to correct or minimize this condition. This I accomplish by forming in the skirt of the piston a tongue and controlling the action of the tongue with a thermostatic device arranged inside the piston and operable to cause the tongue to project slightly when the piston is relatively cold and to retract the same when the piston becomes heated.

In the accompanying drawings—

The piston may be of any design and in its side opposite the power stroke thrust there is formed a tongue 10. This tongue may be of any size or shape and extend in any desired direction. The tongue is arranged to project slightly beyond the adjacent piston when the piston is relatively cool and a thermostatic device is provided to cause the tongue to be retracted when the piston becomes hot. Various forms of thermostatic devices may be employed.

Figure 1:
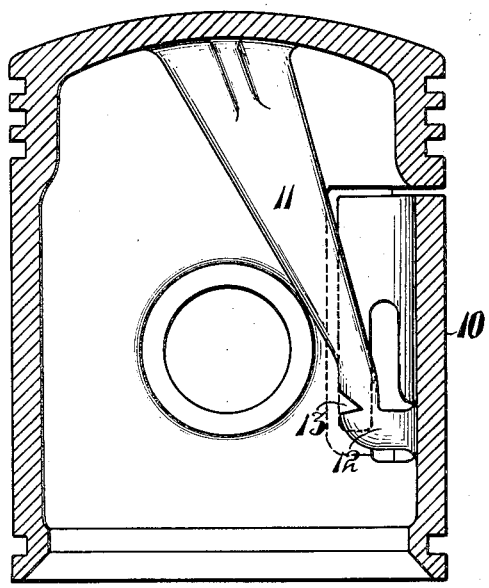
Fig. 1 shows a vertical, central, sectional view of a piston embodying one form of my invention.

In Fig. 1 I show an arm 11, preferably cast on to the inside of the cylinder head near the center thereof and extending downwardly and joined to the base of the tongue by a lug 12. When the piston is relatively cool the length of the bar is such as to allow the free end of the tongue to project slightly beyond the adjacent walls of the piston. When, however, the piston becomes hot the bar will be heated on account of its connection with the cylinder head and will expand sufficiently to exert a downward thrust on the lug 12 and act bell crank fashion to cause the tongue to be retracted. The bar, being joined to the head of the piston where the heat is highest, will be subjected to considerable temperature variation resulting in elongation and shortening of the bar. At the same time the tongue and adjacent walls of the piston being in contact with the water-cooled cylinder will be subject to less expansion and contraction. Preferably the part between the bar and lug is notched, as shown at 13, so that the two parts may move relatively.

Figure 3:
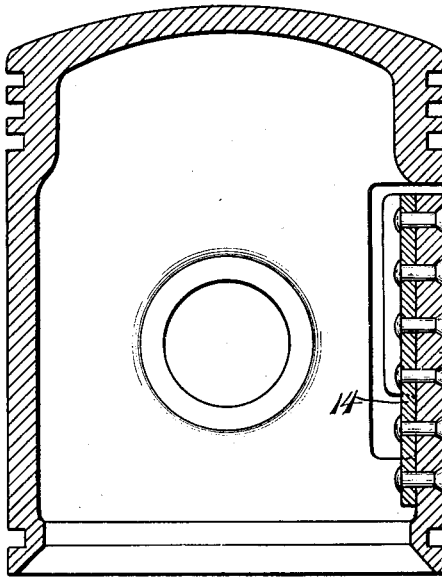
Figure 4:
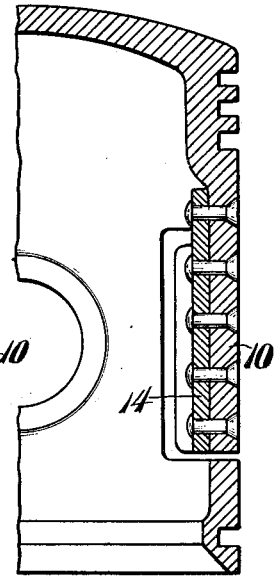

In Figs. 3 and 4 I show another form of thermostatic device consisting of a bar 14 riveted or otherwise fastened to the tongue 10. This bar is formed of a metal having a coefficient of expansion less than that of the metal which forms the tongue and the piston, and, being on the inside of the piston wall, will be less affected by the heat within the cylinder. Therefore, when the piston heats up the tongue will expand a greater amount than the bar 14 and thereby the tongue will be drawn inwardly.

Figure 5:
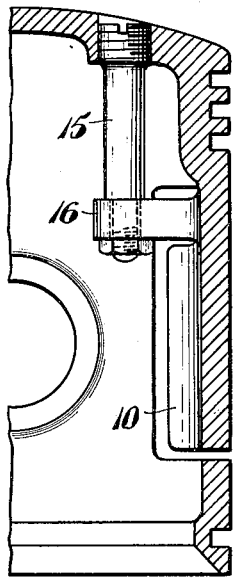
Figs. 3, 4 and 5 show vertical, central, sectional views of a modified form of piston embodying my invention.

A similar action can be brought about by an arrangement such as shown in Fig. 5, which comprises a bolt 15 fitted into the head of the piston near the rim thereof and connected at its lower end to a lug 16, which projects out from the base of the tongue. The bolt has a rate of expansion less than the metal of the tongue and piston, and, being separately connected to the piston, it will receive less heat than the tongue. Consequently, it will expand less under operating conditions and thus will serve to draw the tongue inwardly when the piston becomes heated.

The tongue in each case is formed on that side of the piston opposite the power stroke thrust, and, since it projects slightly beyond the adjacent walls of the piston when the piston is cool, it will serve to overcome piston slap and likewise it will have a dampening effect upon vibrations.

Figure 2:
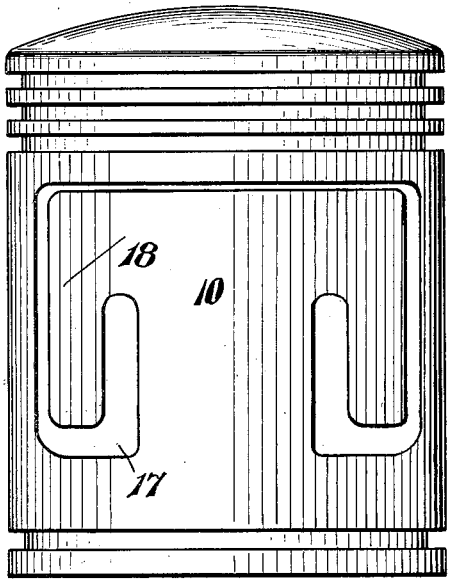
Fig. 2 shows a side elevation of the same.

As shown in Figs. 1 and 2 the width of the tongue may be extended to within a short distance of the pin bosses so as to cover approximately one-third the circumference of the piston. By so widening the tongue I am enabled to absorb the slap which otherwise would occur in a direction parallel with the axis of the wrist pin, as well as the slap tending to occur in a direction at right angles thereto. Preferably the tongue at each side of its anchored end is cut inwardly in the shape of an L, as indicated at 17 in Fig. 2. This will leave a wing 18 at each side of the tongue, which wings are free to move in and out at both their upper and lower ends, thus serving effectually to overcome slapping of the piston, particularly in a direction parallel with the axis of the wrist pin.

The cut or kerf separating the flap from the body of the piston does not extend to the bottom of the skirt, thus leaving the entire circumference of the lower end of the piston intact so as to avoid weakening of the piston.

Various changes in the construction and arrangement of the several parts herein shown and described may be employed without departing from the spirit of my invention as disclosed in the appended claim.

Having thus described my invention, what I claim and desire to secure by Letters Patent is:—

A piston for internal combustion engines having its skirt portion cut to form a tongue extending over approximately one-third the circumference of the piston and means automatically responsive to changes in the temperature of the piston to cause the tongue to be projected when the engine is relatively cool and to be retracted when the piston becomes heated, said tongue being cut inwardly at each side of its anchored end to form at each side a wing portion whose upper and lower ends are free to move.

ELBERT J. HALL.